(12) United States Patent
Jason, Jr.

(10) Patent No.: US 7,355,971 B2
(45) Date of Patent: Apr. 8, 2008

(54) DETERMINING PACKET SIZE IN NETWORKING

(75) Inventor: James L. Jason, Jr., Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 1197 days.

(21) Appl. No.: 10/045,671

(22) Filed: Oct. 22, 2001

(65) Prior Publication Data

US 2003/0076850 A1    Apr. 24, 2003

(51) Int. Cl.
*H04J 3/24* (2006.01)
*H04L 12/28* (2006.01)
*G06F 15/16* (2006.01)

(52) U.S. Cl. ............ 370/231; 370/389; 370/473; 709/232; 709/238

(58) Field of Classification Search ........ 370/231, 370/389, 473; 709/232, 238
See application file for complete search history.

(56) References Cited

U.S. PATENT DOCUMENTS

| | | | | |
|---|---|---|---|---|
| 5,396,490 A | * | 3/1995 | White et al. | 370/474 |
| 5,809,254 A | * | 9/1998 | Matsuzono | 709/235 |
| 5,892,753 A | * | 4/1999 | Badt et al. | 370/233 |
| 6,144,645 A | * | 11/2000 | Struhsaker et al. | 370/280 |
| 6,212,190 B1 | * | 4/2001 | Mulligan | 370/400 |
| 6,327,626 B1 | * | 12/2001 | Schroeder et al. | 709/236 |
| 6,477,143 B1 | * | 11/2002 | Ginossar | 370/230 |
| 6,650,652 B1 | * | 11/2003 | Valencia | 370/433 |
| 6,751,234 B1 | * | 6/2004 | Ono | 370/474 |
| 6,757,255 B1 | * | 6/2004 | Aoki et al. | 370/252 |
| 6,788,704 B1 | * | 9/2004 | Lindsay | 370/465 |
| 6,795,866 B1 | * | 9/2004 | Mankude et al. | 709/238 |
| 6,870,850 B1 | * | 3/2005 | Fichou et al. | 370/400 |
| 6,891,832 B1 | * | 5/2005 | Chien et al. | 370/395.1 |
| 6,934,768 B1 | * | 8/2005 | Block et al. | 709/248 |
| 6,961,326 B1 | * | 11/2005 | Chang et al. | 370/338 |
| 7,089,320 B1 | * | 8/2006 | Biederman et al. | 709/234 |
| 2002/0186660 A1 | * | 12/2002 | Bahadiroglu | 370/248 |

* cited by examiner

Primary Examiner—Alpus H. Hsu
(74) Attorney, Agent, or Firm—Fish & Richardson P.C.

(57) ABSTRACT

A method of determining a maximum packet size for data packets sent along a network path. A sending computer sends a packet to a receiving computer through a sending interface. The packet is fragmented during transfer to a receiving interface. The fragments are analyzed at the receiving interface and their size determined. The size of a fragment is compared to a pre-determined maximum packet size, and in response to the comparison, the maximum packet size is changed. The change is then reported to the sending interface and stored in a memory. Subsequent communications from the sending interface to the receiving interface are sent in packets of the size stored in the memory. Because the maximum packet size of a network path can change over time, test packets can be sent periodically to determine the maximum packet size.

32 Claims, 7 Drawing Sheets

DETERMINING PACKET SIZE IN NETWORKING

TECHNICAL FIELD

This invention relates to determining packet size in networking.

BACKGROUND

Figure 1:
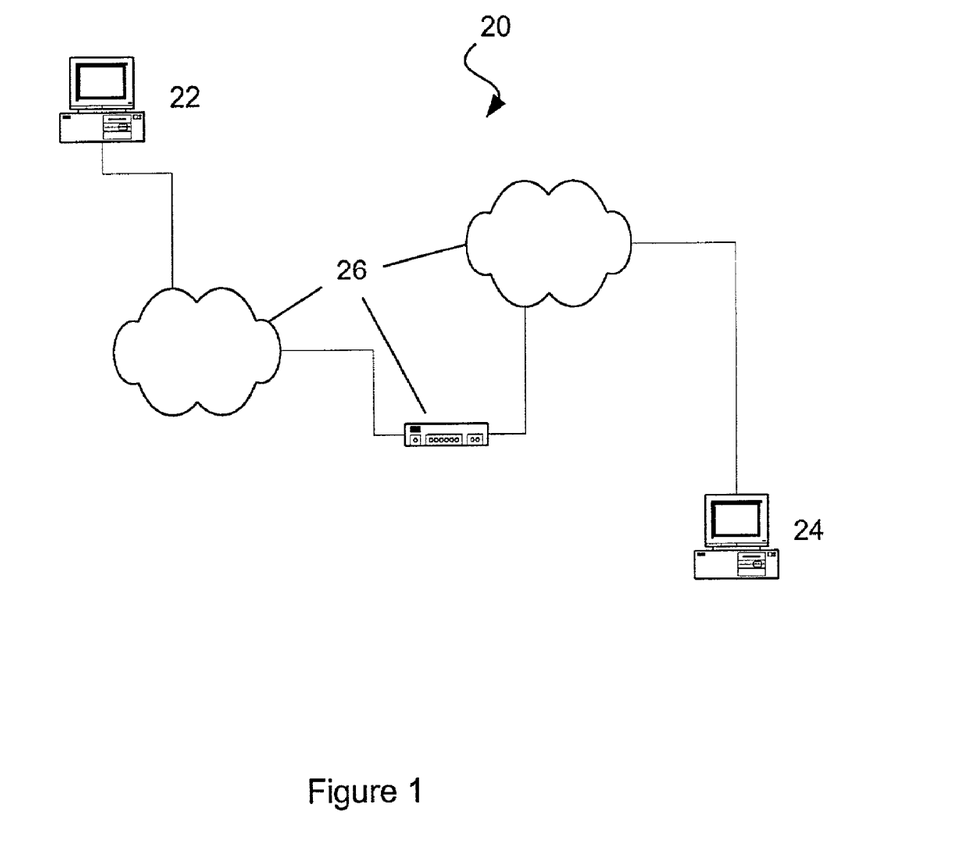
FIG. 1 is a block diagram of a network path.

When communicating a message between two points on a computer network, the message can be sent in discrete-sized packets. Properties of the network constrain the maximum size of the packet, or maximum transfer unit (MTU), which can be sent along a network path 20 from a particular sending point 22 to a particular receiving point 24, as shown in FIG. 1. For example, the underlying hardware used to implement the path on the network, such as hardware using 100 Mbit Ethernet technology, will impose limitations on the path MTU. Furthermore, the data packets may pass through several intermediary points 26, such as routers, as they travel from the sending point 22 to the receiving point 24. The path MTU may be further limited by the technology used between some of these intermediary points.

Figure 2A:
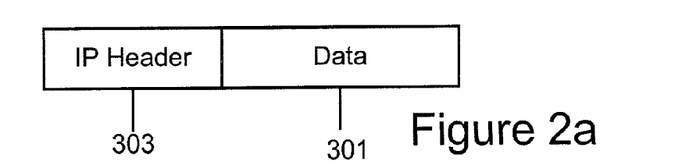
FIGS. 2a-2e are diagrams of data packets.
Figure 2B:
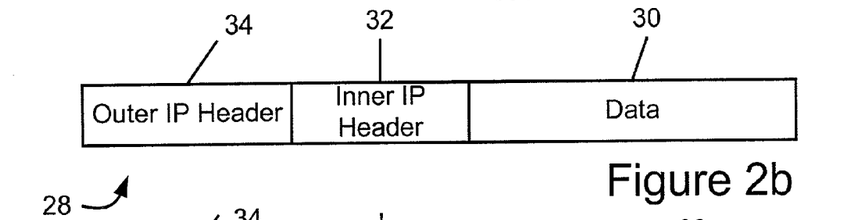

FIG. 2a shows a typical Internet Protocol (IP) data packet. Prepended to the data 301 is an IP header 303, containing information necessary for communicating the packet from the sending point 22 to the receiving point 24. FIG. 2b shows an IP datagram that has been encapsulated with an additional outer IP header 34. This additional encapsulation can take place at the sending point 22 or one of the routers. Encapsulating, with an outer header, data that has previously been encapsulated with an inner header is commonly referred to as IP-in-IP encapsulation, or tunneling.

Figure 2C:
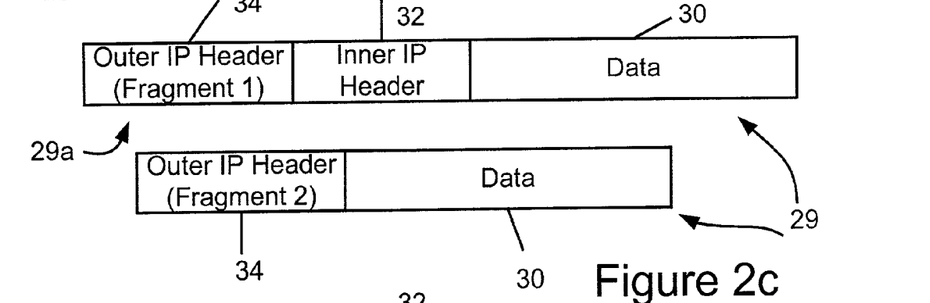
Figure 2D:
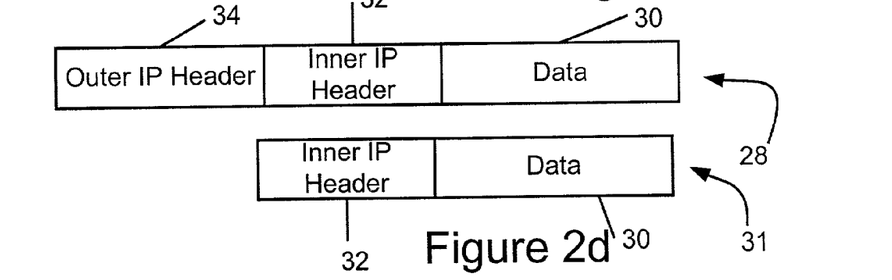

If the sending point 22 sends a packet that is larger than the path MTU, routers along the network path will fragment the packet 28 into smaller pieces, or fragments 29, during the transmission. Typical fragments 29 are shown in FIG. 2c. After creating the fragments, the router re-encapsulates the data such that each of the fragments 29 will have the tunneling outer header 34 prepended to the data 30, but only the first fragment 29a of the data packet will have the inner header 32. These fragments 29 are cached at the receiving point 24 until all of the fragments 29 of the packet have been received or until the reassembly timer for the datagram has expired and the fragments are discarded. The information in the headers 32, 34 gives the receiving point information on how the fragments 29 should be grouped and handled upon receipt. As shown in FIG. 2d, the fragments 29 can then be reassembled (into the packet 28) from the cache at the receiving point 24. After reassembly, the tunneling outer IP header can be stripped off, leaving the inner packet 31 with only the inner IP header prepended. The packet 31 can then be sent on in the usual way.

One way of eliminating the consumption of computing resources needed for caching and reassembly, for example, in the tunneling context, is for the sending point 22 to determine the path MTU in advance. With knowledge of the path MTU, the sending point 22 can send packets 52, shown in FIG. 2e, which will be small enough so that they will not be fragmented in their travel to the destination. Because a router does not fragment the packets 52, they will not need to be cached and reassembled at the receiving point 24. The router simply has to remove the outer IP header and send the encapsulated datagram on its way. With reference to FIG. 3, the sending point 22 begins the determination by sending a probe packet in which a "don't fragment" bit is set (steps 300-304). The size of the probe packet is the largest possible packet that the networking technology at the sending point will allow (the MTU of the link layer). Because the "don't fragment" bit is set, if the packet is larger than the MTU of the path, it will not be fragmented. Instead, an error message will be sent back to the sending point if that packet otherwise would have been fragmented (steps 306-308). The sending point then sends a smaller probe packet with the "don't fragment" bit set. This process (steps 300-308) is repeated until a packet is sent that is small enough to travel to the receiving point without fragmenting. When it receives no error message, the sending point knows that the size of the message that was able to pass is the path MTU (step 310).

DETAILED DESCRIPTION

Figure 4:
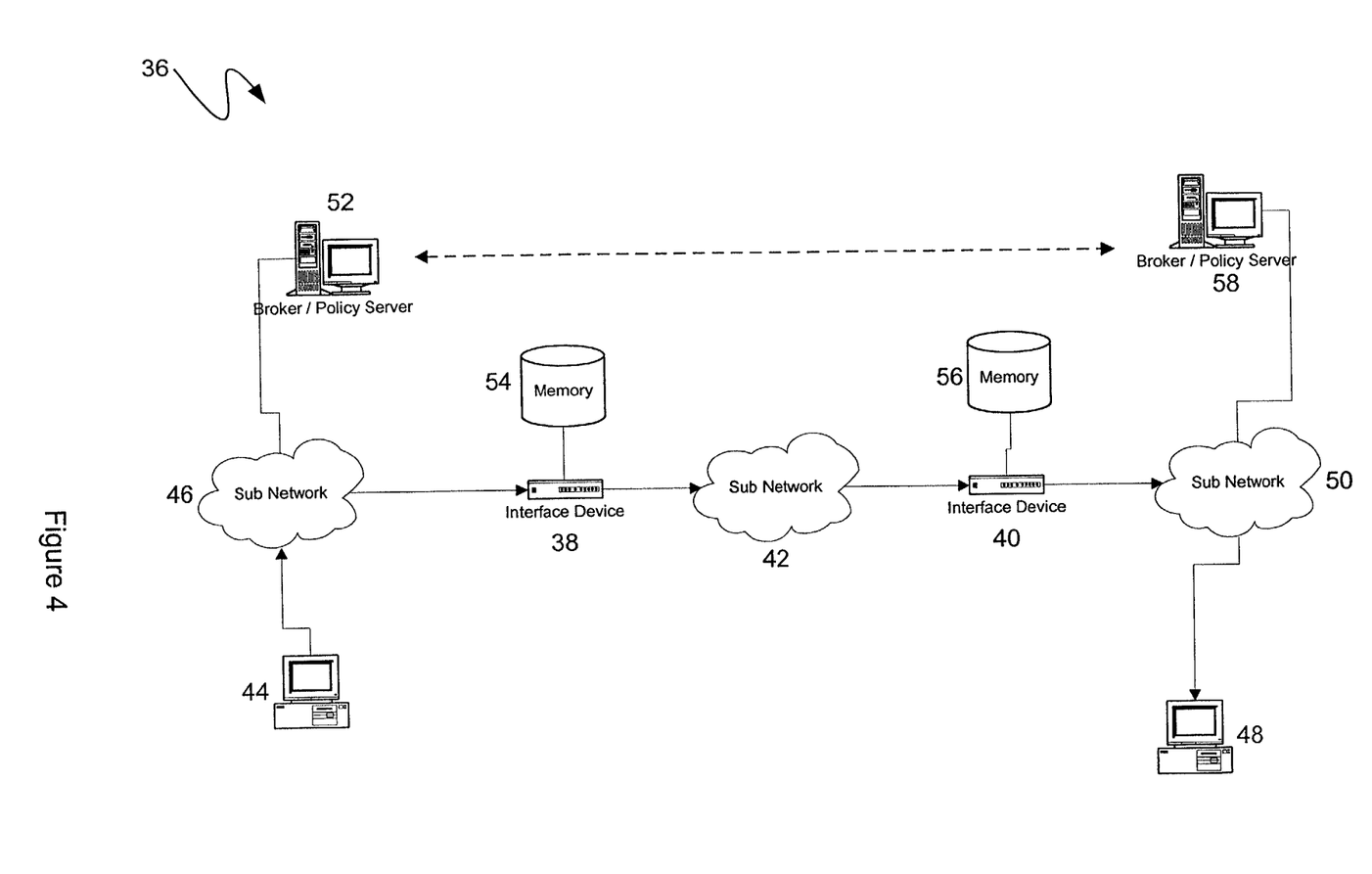
FIG. 4 is a diagram of a computer network.

To eliminate the need for sending several probe packets to determine a path MTU, the MTU is determined at a receiving network point and communicated to the sender. FIG. 4 shows a computer network 36 for communicating packets of data. The network 36 includes a sending interface device 38 and a receiving interface device 40. The two interface devices 38, 40 are connected to one another across a sub network 42. A sending computer 44 on sub network 46 communicates with a receiving computer 48 on sub network 50 by sending data packets through the sending interface device 38. The sending interface device 38 regulates the size of the data packets and encapsulates them with header information. Each packet is then sent to the receiving interface device 40, which decapsulates the packet before it is sent to the receiving computer 48 on the sub network 50.

Figure 5:
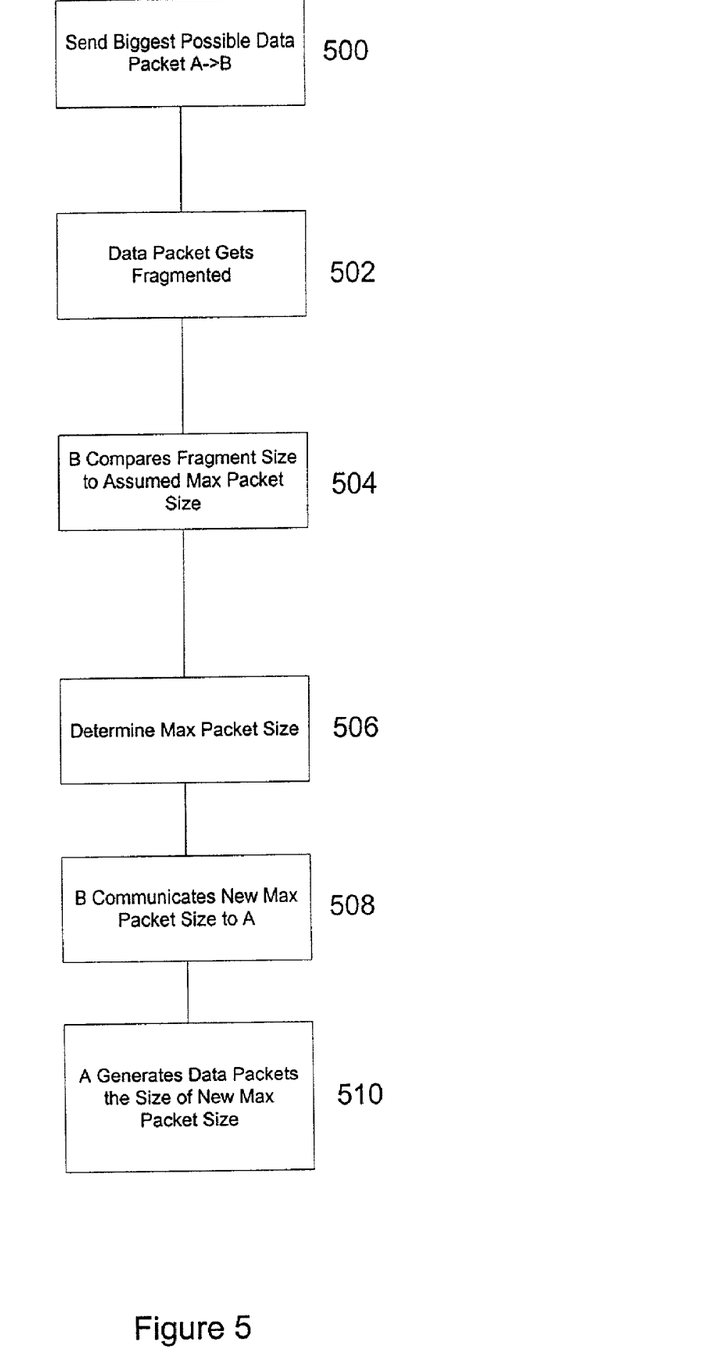
FIG. 5 is a flow chart of a method of determining a path MTU at a receiving point.

FIG. 5 shows a method of determining the path MTU at the receiving point. When the sending computer sends a packet to the receiving computer, the sending interface device assumes that the path MTU is the MTU of the link layer at the sending interface device and the sub network. It then sends a packet of that size (step 500). If that packet is larger than the actual MTU of the path between the sending and receiving interface devices, the packet gets fragmented (step 502). The receiving interface device receives the fragments and determines the size of the largest fragment (step 504). This size is the path MTU (step 506). The receiving interface device communicates this MTU to the sending interface device (step 508). The sending interface device can then optimize the efficiency of data communication between the two interface devices by sending packets of the largest possible size that will not get fragmented (step 510).

Figure 6:
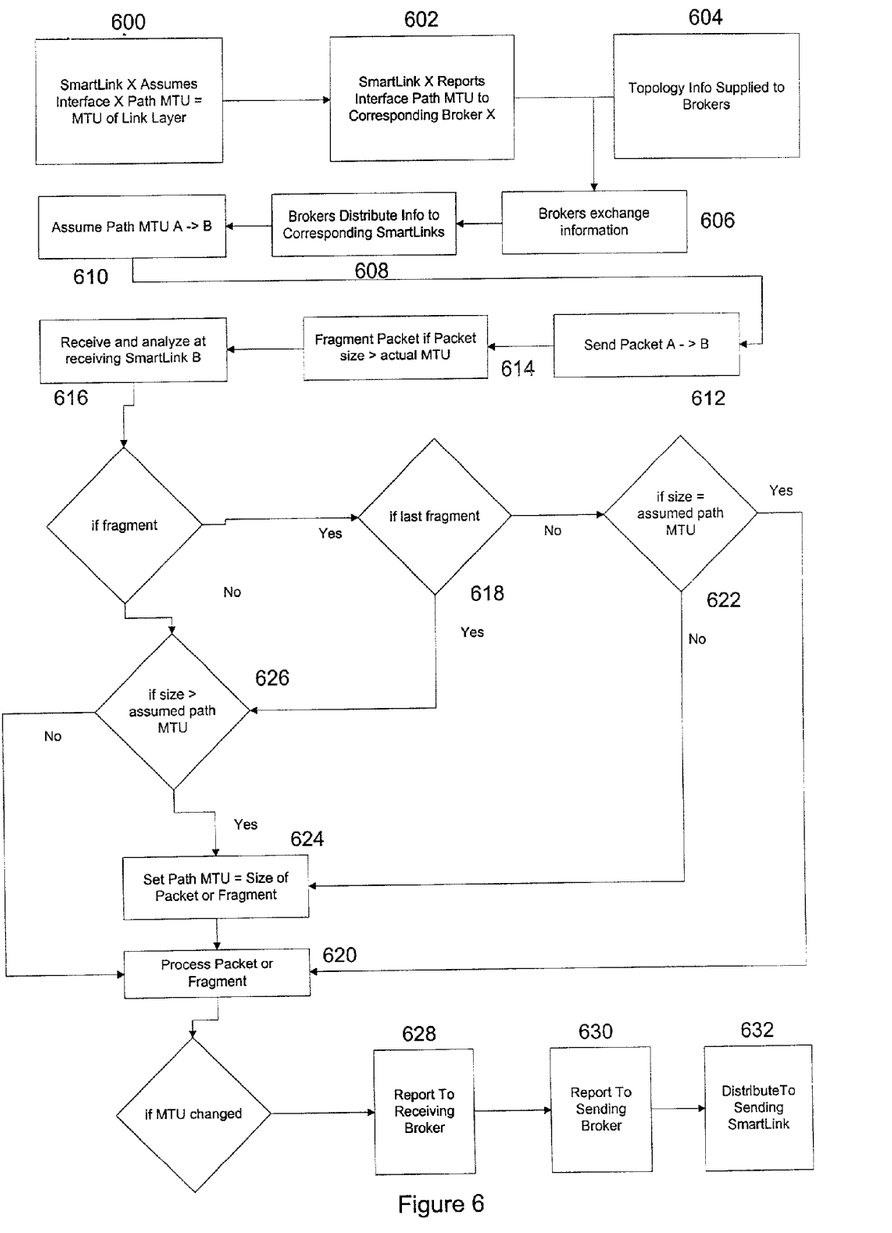
FIG. 6 is a flow chart of a more detailed method of determining a path MTU at a receiving point.

FIG. 6 shows a more detailed method of determining the path MTU at the receiving point. The interface devices provide interfaces between multiple sub networks, encapsulate and decapsulate data, and collect information about the data passing through them. The sending interface device 38 initially assumes that the MTU for the border between the sending interface device and the sub network 42 is the MTU of its link layer (step 600). The sending interface device 38 reports this information to a sending policy broker 52 (step 602). Similarly, other interface devices on the network, including the receiving interface device 40, assume an initial MTU for their interfaces and report this information to their corresponding policy brokers. The brokers then exchange this information among themselves (step 606). Each broker then distributes this information to its corresponding interface device (608). Based on this information, the sending interface device 38 assumes a path MTU between it and the receiving interface device (step 610). It stores this assumed MTU in a computer memory 54. Similarly, the receiving interface device 40 assumes a path MTU and stores it in a computer memory 56. Alternatively, each interface device can assume that the path MTU is the MTU of the link layer at the border between that interface device and the sub network without incorporating information collected by brokers. The actual path MTU may be different than either of the assumed MTUs due to network constraints not factored into the initial exchange of information between the brokers and interface devices.

The sending computer 44 sends data to the receiving computer 48 through the sending interface device 38 (step 612). The sending interface device 38 breaks up the data and encapsulates it to form packets of the size of the assumed MTU stored in the computer memory 54. If the packet is larger than the path MTU, the packet is fragmented as it is sent to the receiving interface device 40 (step 614). After receiving the packets, the receiving interface device 40 analyzes the fragments to determine their sizes (616). If the fragment being analyzed is the last fragment in a packet (step 618), the size is checked to see if it is greater than the path MTU (as are non-fragmented datagrams). If so, the path MTU is changed. If it is not larger than the path MTU, then the path MTU is not changed as it most likely that the last fragment will be smaller than the path MTU.

If the fragment is not the final fragment, then its size is compared to the assumed path MTU stored in the computer memory 56 (step 622). If it is the same size as the receiving interface device's assumed path MTU, then the receiving interface device 40 will consider the assumed path MTU to be the actual path MTU and will not change its assumed path MTU (step 620). If the fragment is larger than the assumed path MTU, the receiving interface device 40 will know that the actual path MTU is greater than the assumed path MTU and change the assumed path MTU stored in the memory 56 to be equal to the fragment size (step 624). If the fragment is smaller than the assumed path MTU, the receiving interface device 40 will know that the actual path MTU is smaller than the assumed path MTU and change the assumed path MTU in the memory to be equal to the fragment size (step 624).

If the size of the packet is not larger than the path MTU, it will not be fragmented when it is communicated to the receiving interface device 40. The receiving interface device 40 analyzes the size of the unfragmented packet and compares it to the assumed path MTU in the memory 56 (step 626). If it is greater than the assumed path MTU, the path MTU is changed in the memory 56 to equal the size of the packet (step 624), since packets of at least that size can be sent by the sending interface device 38 without fragmentation. If it is not greater than the assumed MTU, the assumed path MTU is not changed in the memory 56 (step 620).

After analyzing the packet or fragments, the receiving interface device 40 reports its assumed path MTU to a receiving broker 58 (step 628). Alternately, the interface device 40 only reports the assumed path MTU to its broker 58 if its assumed MTU has changed. In either case, the receiving broker 58 communicates the assumed path MTU to the sending broker (step 630). The sending broker 52 communicates the assumed path MTU to the sending interface device 38 (step 632), which updates its assumed path MTU in the memory 54. In subsequent communications to the receiving interface device 40, the sending interface device 38 sends packets of the size of the new assumed path MTU.

The network path between the sending interface device and the receiving interface device may not remain static. It is possible that segments of the network path connecting intermediary points between the sending and receiving interface devices could be broken, or shorter or more efficient segments could be added. This changes the topology of the network and could change the path that data packets travel when being communicated between the sending and receiving interface devices. Thus the path MTU between the sending and receiving interface devices may occasionally change. One way to compensate for this change is for the receiving interface device 40 to communicate a new path MTU to the sending interface device 38 any time it detects a change. Another way is for the sending interface device 38 to occasionally send a control packet to the receiving interface device 40. This packet is the largest possible packet allowed by the technology of the sending interface device's link layer. As above, if the packet is larger than the actual path MTU, it will be fragmented before reaching the receiving interface device 40. The receiving interface device 40 then analyzes the packet or fragments to determine the actual path MTU, updates the assumed path MTU in the memory 56, and reports it back to the sending interface device 38, which updates the assumed MTU value in the memory 54. The sending interface device 38 will send subsequent communications in packets of the size of the new assumed path MTU until that value is again changed in the memory 54.

Figure 7:
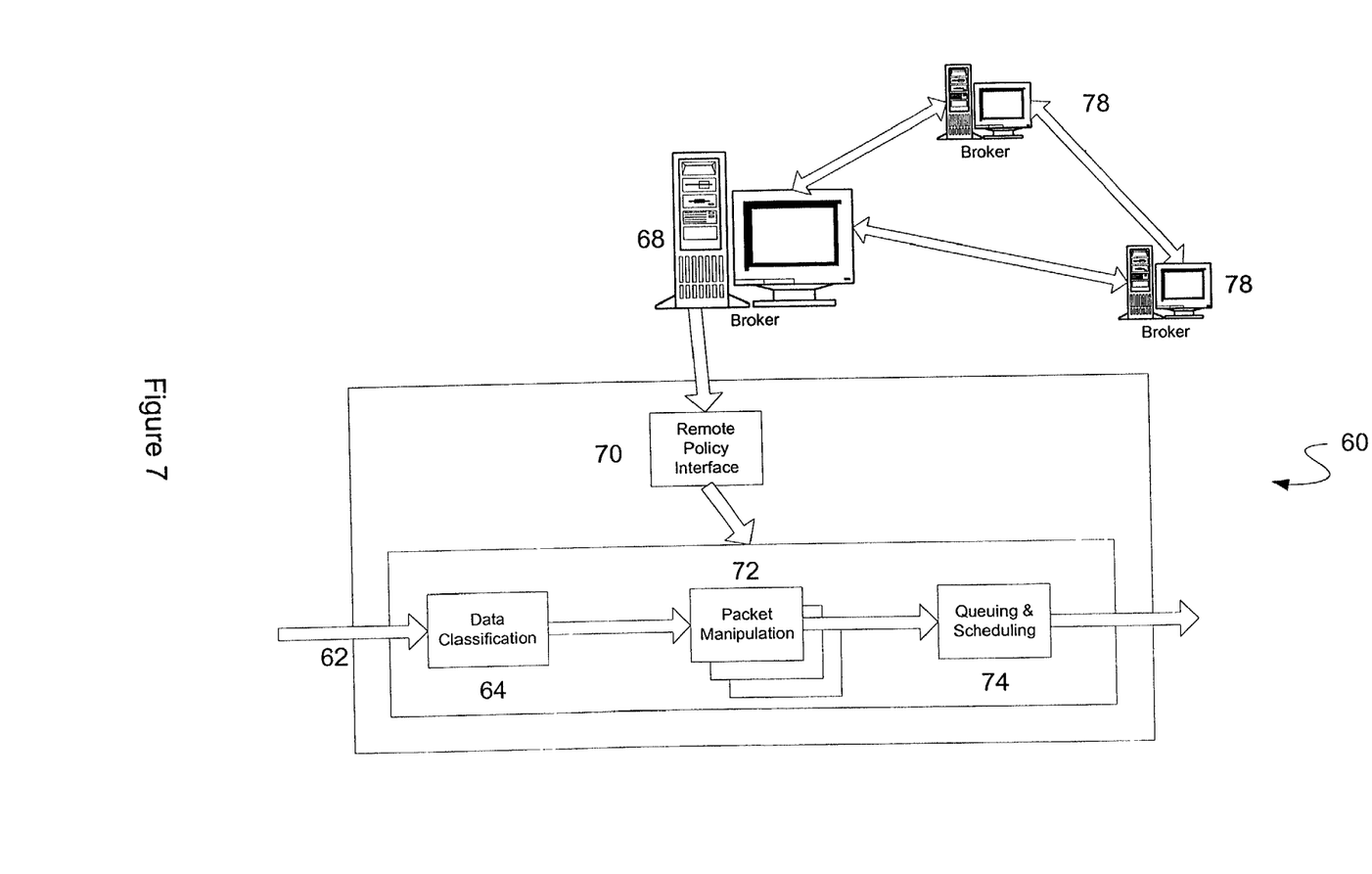
FIG. 7 is a block diagram of an interface device.

FIG. 7 shows an interface device. A data message 62 enters the interface device 60 and is classified using a data classification module 64. The data classification module 64 analyzes the header encapsulated with the data to determine whether the data is a packet or a fragment, and if it is a fragment, to determine whether it the last fragment of a packet. The data can be classified using a variety of criteria to determine how the network prioritizes and processes the data. A policy, including information about the path MTU, is dictated to the interface device 60 by a broker 68 corresponding to the interface device 60, and is received through a remote policy interface 70. The classification module analyzes the data and determines whether it needs to be encapsulated or decapsulated. The encapsulation or decapsulation is then performed, according to the policy, using a packet manipulation module 72.

Figure 2E:
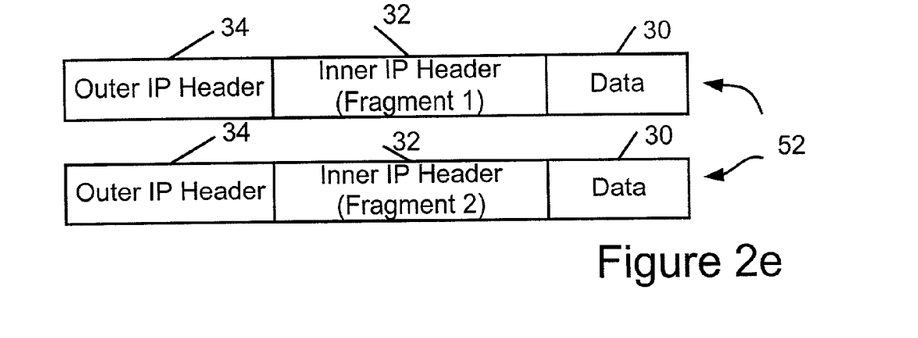
Figure 3:
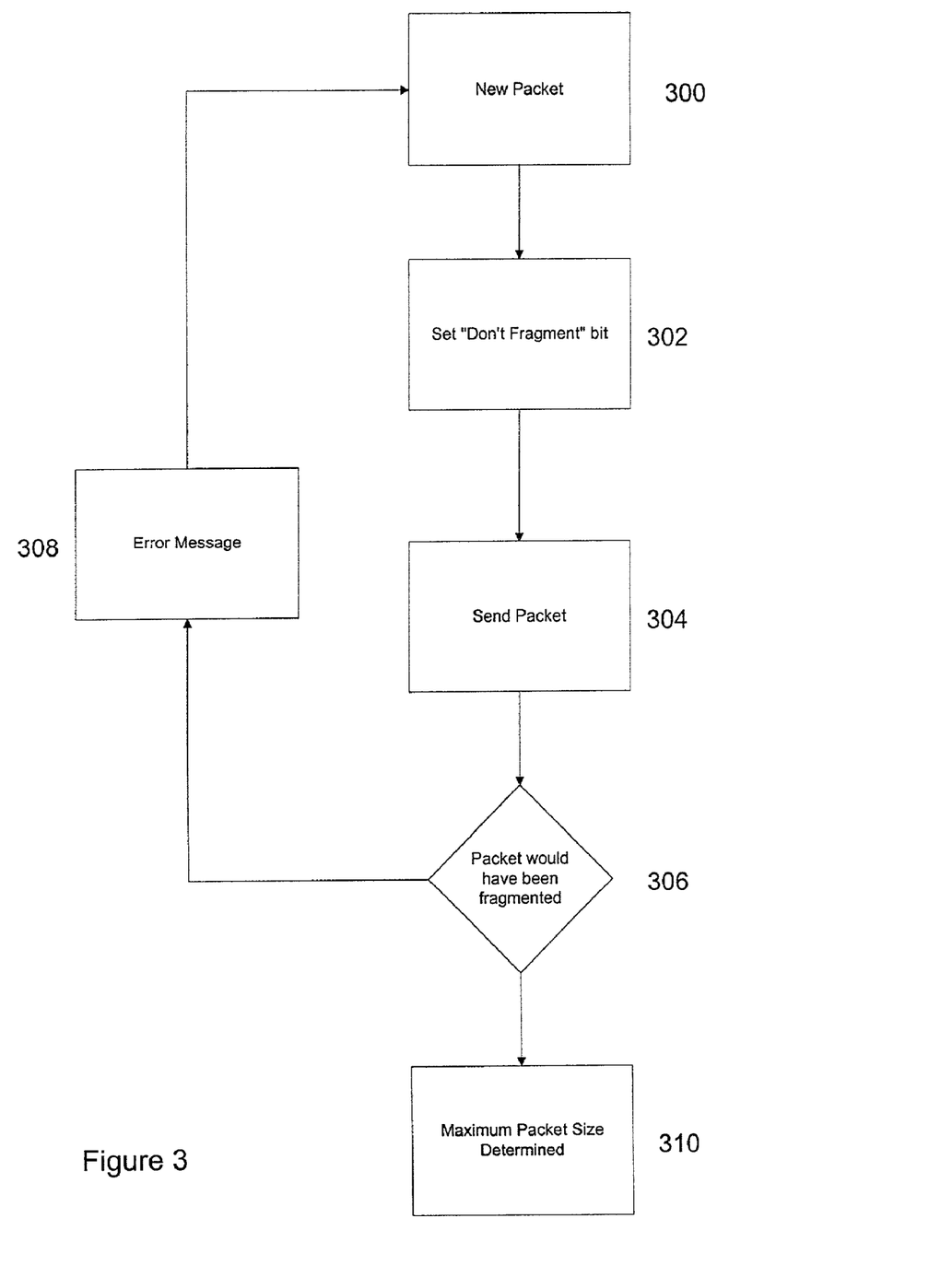
FIG. 3 is a flow chart of a method of determining a path MTU at a sending point.

In the case of encapsulation, the MTU value, which is known to the packet manipulation module, is used to fragment the inner packet as shown in FIG. 2e with each fragment 52 carrying the related inner IP header 32. The tunneling outer header 34 is then prepended to each fragment. The data packets are then queued and scheduled for sending according to a policy, using a queuing and scheduling module 74. The policy is received from the broker through the remote policy interface 70.

By fragmenting the packets as shown in FIG. 2e, a receiving device that is to decapsulate the incoming packet need not cache all fragments or wait until they have all been received before it proceeds to strip the outer header off each inner fragment and sending it along immediately based on the inner IP header.

Among other things, the packet manipulation module 72 analyzes the packet or fragment and determines its size, determines the path MTU from the size, and forwards the path MTU to the receiving broker 58. Alternatively, the packet manipulation module 72 forwards the size to the receiving broker 58, which determines the path MTU. The receiving broker 58 forwards the path MTU to the sending broker 38. The sending broker 52 formulates a policy, including the size of packets to send, based on the path MTU information received from the receiving broker 58. It then forwards this policy to the sending interface device 38 through the remote policy interface 70 of the sending interface device 38. In future communications, data is sent as packets of a size conforming to the policy, and thus should not be fragmented.

The invention may be embodied in the form of hardware, firmware, or software, using a processor and a medium which bears the software. The medium can be a memory, a mass storage device, or a communication channel, among other things. The processor can be part of a computer or other machine that includes a system bus, memory, I/O drivers, and I/O devices.

Other embodiments are within the scope of the following claims.

What is claimed is:

1. A method comprising:
    sending a data packet along a path from a first network point to a second network point;
    along the path, generating fragment packets from the data packet;
    receiving at least one of the fragment packets at the second network point;
    analyzing the size of at least one of the received fragment packets and comparing the size to a maximum packet size; and
    depending on a result of the analysis, re-setting the maximum packet size based on the size of the at least one of the fragment packets.

2. The method of claim 1 also including re-setting the maximum packet size to equal the size of one of the fragment packets.

3. The method of claim 1 also including communicating the reset maximum packet size to the first network point.

4. The method of claim 3 also including refraining from communicating the reset maximum packet size unless the maximum packet size of the path has changed.

5. The method of claim 1 also including communicating the reset maximum packet size from the second network point.

6. The method of claim 1 also including storing the maximum packet size.

7. The method of claim 1 also including refraining from changing the maximum packet size if the fragment analyzed comprises the final fragment of the data packet.

8. The method of claim 1 in which the data packet that is sent along the path is of the largest size allowed by the network technology at the first point.

9. The method of claim 8 also including periodically repeating the sending, generating, analyzing, and resetting.

10. A method comprising:
    storing a maximum packet size of a network path from a sending point to the receiving point;
    receiving, at the receiving point, a collection of fragments of a data packet transmitted over the network path, wherein the data packet is fragmented along the network path;
    determining, a size of a largest fragment of the data packet transmitted over the network path;
    comparing the size of the largest fragment of the data packet to the maximum packet size; and
    resetting the maximum data packet size of the network path based on the determined size of the largest fragment of the data packet transmitted over the network path.

11. The method of claim 10 also including communicating the maximum data packet size to the sending point.

12. The method of claim 11 also including sending a message of the size of the maximum data packet size from the sending point to the receiving point.

13. The method of claim 10, further comprising
    sending the data packet from the sending point to the receiving point.

14. The method of claim 10 also including reporting the maximum packet size to the sending point.

15. A method comprising:
    sending a data message along a network path from a sending point to a receiving point, wherein a size of the data message is larger than a path maximum transfer unit and the data message is fragmented along the network path;
    determining a size of a largest fragment of the data message at the receiving point; and
    based on the determination, setting a maximum packet size between sending and receiving points.

16. The method of claim 15 also including:
    fragmenting the data message if its size exceeds a maximum packet size; and
    optimizing communication based on the determination.

17. The method of claim 16, also including periodically sending a test data message.

18. The method of claim 17, in which the test message is larger than the maximum packet size.

19. A method for determining a maximum packet size of a network path, the method comprising:
    sending a data packet along the network path to a receiving node;
    receiving a response from the receiving node, the response including information determined based on a size of a fragment of the data packet, the fragment formed along the network path; and
    setting the maximum packet size of the network path based on the response.

20. The method of claim 19, also including fragmenting the packet into fragments.

21. The method of claim 19, also including comparing the size of a fragment to a predetermined maximum packet size.

22. The method of claim 19, also including sending the maximum packet size to a sending point on the network path.

23. The method of claim 22, also including generating packets at the sending point, the packets at least as small as the maximum packet size.

24. A method comprising:
    sending a data packet on a path from a first network point to a second network point;
    along the path, generating fragment packets from the data packet;
    receiving at least one of the fragment packets at the second network point; and analyzing a size of at least one of the received fragment packets to determine a path maximum packet size.

25. The method of claim 24 also including comparing the size of the fragment to a predetermined maximum packet size.

26. The method of claim 25 also including resetting the predetermined maximum packet size to equal the size of the fragment.

27. The method of claim 24 also including, based on the comparison, choosing an optimal packet size for packets sending packets from the first to the second network points.

28. A method comprising:
sending a data packet along a network path, the data packet being larger than a maximum packet size of the network path;
fragmenting the packet into fragments;
receiving at least one of the fragments at a second network point; and
analyzing the size of one or more of the received fragments to determine the maximum packet size of the path.

29. A method comprising:
sending a message along a network path, the path including sections, each of the sections having a maximum message size to limit the size of messages passing through it, the message being larger than the smallest maximum message size of the sections;
fragmenting the message into fragments, the fragments being at least as small as the smallest maximum message size;
at a receiving point, measuring the size of the largest fragment; and
communicating the size of the largest fragment to a sending point.

30. The method of claim 29 also including comparing the size of the largest fragment to a pre-determined maximum message size.

31. A computer readable medium having embodied therein a computer program, the computer program capable of configuring a computer to:
sending a data packet along a path from a first network point
to a second network point;
along the path, generating fragment packets from the data packet;
analyzing the size of at least one of the fragment packets; and
depending on a result of the analysis, re-setting a maximum packet size based on the size of the one of the fragment packets.

32. The computer readable medium of claim 31, wherein the computer program is also capable of configuring a computer to communicate the new maximum packet size to the first network point.

* * * * *